United States Patent [19]

Shibahata et al.

[11] Patent Number: 4,540,059
[45] Date of Patent: Sep. 10, 1985

[54] VEHICLE STEERING SYSTEM

[75] Inventors: Yasuji Shibahata; Namio Irie, both of Yokohama; Kazuo Ikawa, Tokorozawa; Yohsuke Akatsu, Yokohama, all of Japan

[73] Assignee: Nissan Motor Co., Ltd., Yokohama, Japan

[21] Appl. No.: 495,948

[22] Filed: May 19, 1983

[30] Foreign Application Priority Data

Jun. 7, 1982 [JP] Japan ................................. 57-97368

[51] Int. Cl.³ .............................................. B62D 5/06
[52] U.S. Cl. ..................................... 180/141; 180/148
[58] Field of Search ............... 180/141, 142, 143, 148, 180/132

[56] References Cited

U.S. PATENT DOCUMENTS 4,144,948 3/1979 Sergay ................... 180/148
4,408,673 10/1983 Leiber ................... 180/148
4,440,254 3/1984 Shibahata et al. ............ 180/140

FOREIGN PATENT DOCUMENTS 0054776 6/1982 European Pat. Off. .

Primary Examiner—John A. Pekar
Attorney, Agent, or Firm—Schwartz, Jeffery, Schwaab, Mack, Blumenthal & Evans

[57] ABSTRACT

A hydraulic servo axially biases a rack and pinion steering housing to add an additional amount of steering to the front wheels of a vehicle in response to one of (a) the amount of steering wheel rotation, (b) the rate of steering wheel rotation, or (c) the vehicle yaw rate, to compensate for the effect of cross winds or the like.

6 Claims, 5 Drawing Figures

VEHICLE STEERING SYSTEM

BACKGROUND OF THE INVENTION

1. Field of the Invention

The present invention relates generally to a steering system for correcting or compensating for side winds and the like and more specifically to a system which is applied to a rack and pinion steering system and which does not interfere with normal steering in the event of a malfunction thereof.

2. Description of the Prior Art

A previously proposed arrangement for compensating for the effect of side winds and the like is shown in FIG. 1 of the drawings. In this arrangement a so called "parallel link" type steering arrangement including, a steering gear 1, a pitman arm 2, a cross rod 3, an idler arm 4, side rods 5 and a servo mechanism 6, is mounted on the chassis of the vehicle. As shown, the servo mechanism 6 is controlled by a circuit arrangement including a conversion and compensation circuit 7 which receives an input indicative of the angle of the road wheels with respect to the vehicle chassis, and a yaw rate sensor 8 which senses the rotation of the vehicle about an axis essentially normal to the chassis thereof. The outputs of the compensation circuit 7 and the yaw rate sensor 8 are fed to a mixer 9 which in turn outputs an appropriate signal in accordance with the difference between the signals. With this arrangement the servo mechanism 6 applies an additional amount of steering to the front wheels 10 to compensate for any deviation from the intended course due to side winds or the like.

However, this arrangement has suffered from a notable drawback in that in the event the servo mechanism 6 malfunctions, its interposition between the pitman arm 2 and the cross rod 3 severely hampers efforts to steer the vehicle.

SUMMARY OF THE INVENTION

It is an object of the present invention to provide a steering system which compensates for any undesired deviations from an intended course due to the effect of side winds and the like and which, in the event of malfunction, does not interfere with normal steering.

In brief, the the present invention features a hydraulic servo which axially biases a rack and pinion steering housing in a manner to add an additional amount of steering to the front wheels of a vehicle in response to one of (a) the amount of steering wheel rotation, (b) the rate of steering wheel rotation, or (c) the vehicle yaw rate, to compensate for the effect of cross winds or the like.

More specifically, the present invention takes the form of a steering system for an automotive vehicle, comprising a housing supported on a chassis of the vehicle by an elastomeric member, a rack slidably disposed in the housing, a pinion disposed in the housing, the pinion being arranged to mesh with the rack, a steering wheel operatively connected with the pinion for synchronous rotation therewith, a source of hydraulic fluid under pressure, a hydraulic servo fluidly connected with the source and operatively connected with the housing for selectively biasing same in first and second axial directions, a control valve fluidly interposed between the servo and the source for selectively pressurizing the servo in a manner to bias the housing in the first and second axial directions, and control means operatively connected with the control valve for controlling the control valve in response to a sensed vehicle operating parameter.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
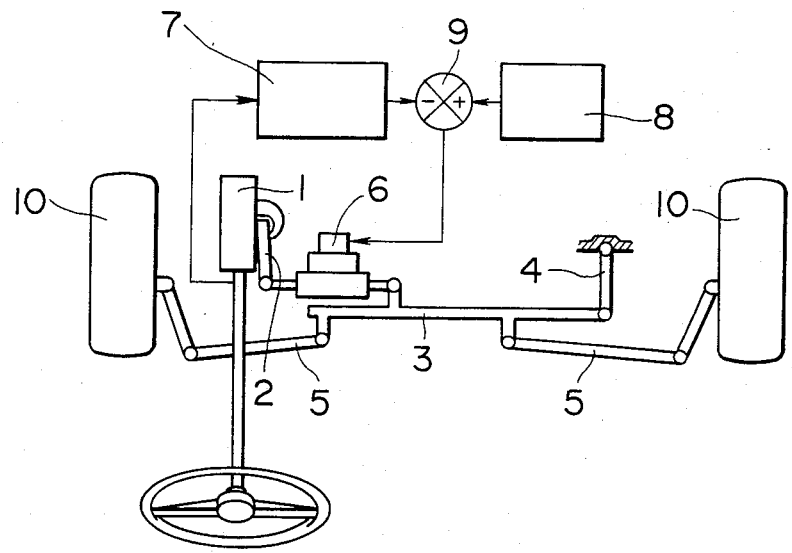
FIG. 1 is a schematic plan view of the prior art arrangement discussed in the opening paragraphs of the present application.
Figure 2:
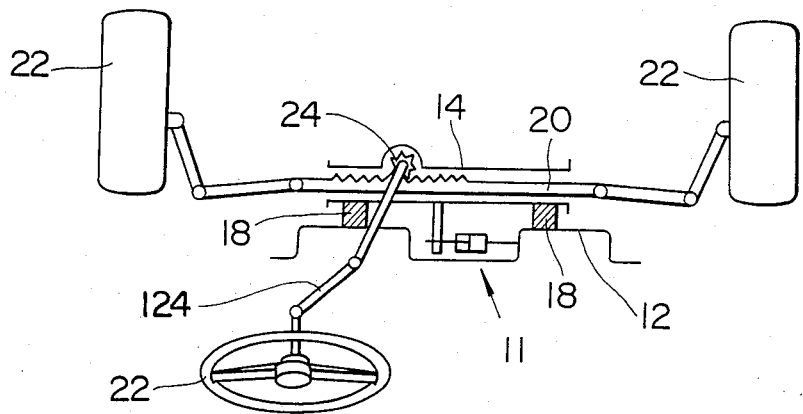
FIG. 2 is a schematic plan view of a first embodiment of the present invention.
Figure 3:
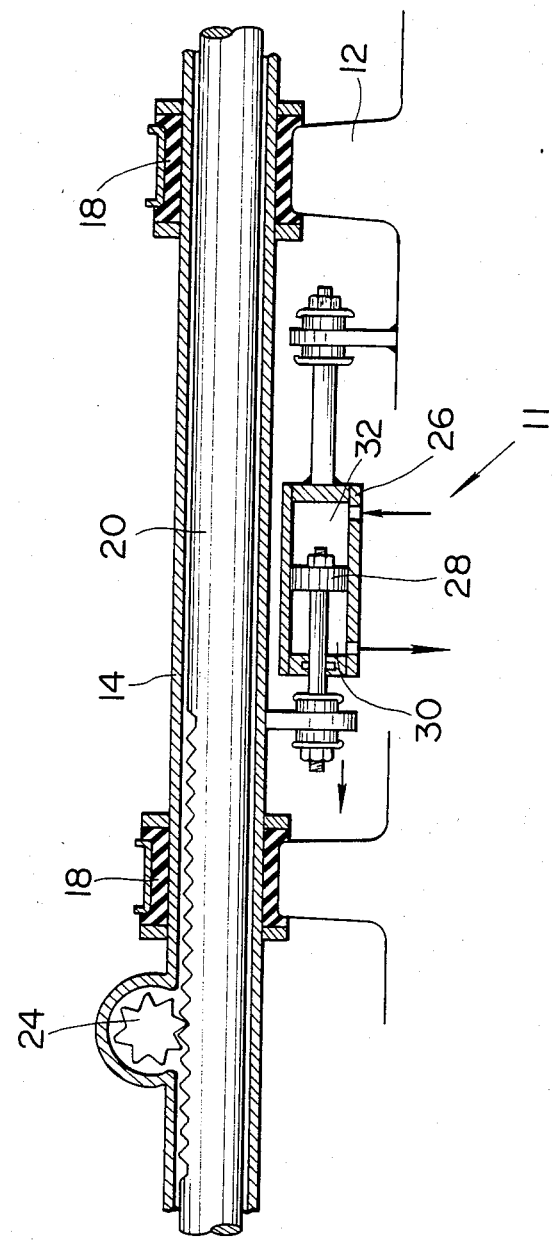
FIG. 3 is a sectional plan view part of the arrangement shown in FIG. 2.
Figure 4:
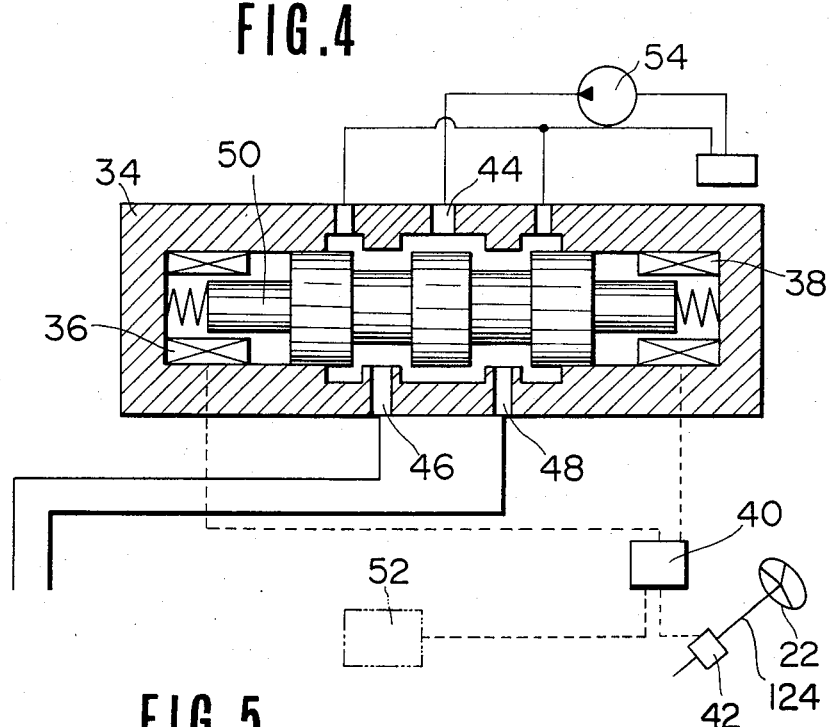
FIG. 4 is a schematic view showing the control valve of the first embodiment in detail.

Turning now to FIGS. 2 to 4 a first embodiment of the present invention is shown. In this arrangement a servo mechanism generally denoted by the numeral 11 is operatively connected between the chassis 12 of the vehicle and the housing 14 of a rack and pinion steering arrangement. As shown, the housing 14 is mounted on the chassis 12 through elastomeric bushes 18 so as to be axially displaceable by a small amount and simultaneously prevent road shocks being directly transmitted to the chassis. The ends of the rack 20 are connected to the front (steerable) wheels 22 in a conventional manner. The pinion 24 of the steering arrangement is rotatably mounted within the housing 14 so as to mesh with the rack teeth of the rack 20 and operatively connected with the steering wheel 22 of the vehicle through a suitable steering column 124.

The servo mechanism in this embodiment, takes the form of a hydraulic cylinder 26 fixedly connected to the chassis 12 and a piston 28 which is connected to the housing 14. As shown, the piston 28 defines first and second variable volume chambers 30,32 within the cylinder 26 which are selectively pressurized by an electromagnetic spool valve 34 (see FIG. 4). The spool valve 34 is provided with solenoids 36, 38 at either end thereof which are operatively connected to a suitable amplifier 40. This amplifier may be of the type which outputs a square wave signal the duty cycle of which is varied in response to a suitable sensed parameter. In this embodiment a steering wheel angular displacement sensor 42 is operatively connected to the steering column 124 and arranged to output a suitable voltage signal which varies with the degree of rotation of the steering wheel from a neutral steering position. This signal is fed to the amplifier 40 which accordingly energizes the solenoids 36, 38 in a manner to reciprocate the spool of the valve so that the communication between a line pressure inlet port 44 and the discharge ports 46, 48 is controlled in a manner that the pressure discharged from the ports 46, 48 to the chambers 30, 32 is regulated or controlled to a level for inducing the appropriate amount axial displacement of the housing 14.

Thus, with this arrangement should the steering wheel 22 be rotated in the clockwise direction (for example) to induce the vehicle to traverse to the right, the angular displacement sensor 42 will output a voltage signal to the amplifier 40. Subsequently, solenoid 36 will be energized with a frequency suitable for inducing the spool 50 to reciprocate in a manner to modulate the output from port 48. Accordingly, the pressure discharged from the spool valve 34 via port 48 will pressurize chamber 26 of the servo mechanism 11 and displace the piston 28 to the left as seen in the drawings. The movement of housing 14 due to the movement of the piston 28 moves the rack and pinion steering arrangement as a whole laterally with respect to the vehicle chassis 12 in a manner which adds to the steering induced by the relative movement of the rack 20 with respect to the housing 14. Rotation of the steering wheel 22 in the reverse direction of course produces a similar effect.

Accordingly, in the case that the vehicle is steered to traverse an arcute path, the inevitable compliance steering effect will tend to be compensated for by the extra rotation (steering) of the front wheels.

According the present invention it is possible to replace the angular displacement sensor 42 with a rate of angular displacement sensor so that very rapid steering requirements induce an increased amount of additional steering as compared with more gradual rotations. Further, it is possible to replace and/or supplement the steering demand parameter mentioned above with a yaw rate sensor 52 (shown in phantom). With this arrangement any undesirable drifting of the vehicle under the influence of strong cross winds may be negated without the driver being required to manually compensate for same via rotation of the steering wheel.

With the above disclosed embodiment, it will be appreciated that should the the pump 54, conduiting or the like of the servo mechanism 11 fail, normal manual steering will be in no way interfered with.

Figure 5:
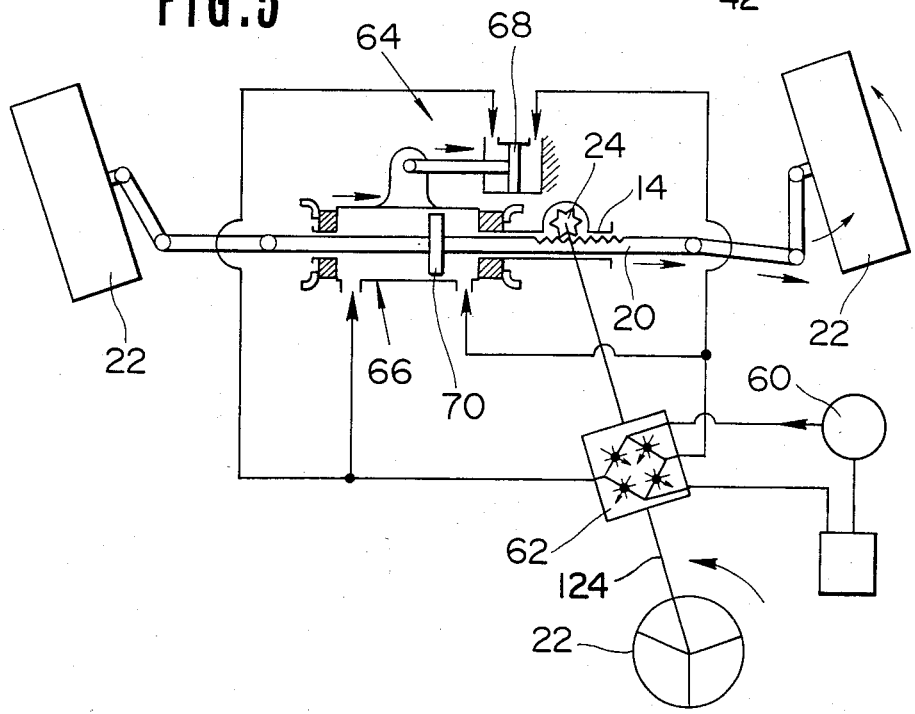
FIG. 5 is a schematic plan view of a second embodiment of the present invention.

FIG. 5 shows a second embodiment of the present invention. In this arrangement a power steering system is incorporated with the rack and pinion steering arrangement. This arrangement features the advantage that a pump 60 and suitable steering sensor in the form of a power steering control valve 62 are already provided whereby an additional servo mechanism denoted by the numeral 64 may be pressurized with the same pressures fed to the power steering servo 66. Thus, as shown the servo is connected to a cylinder defining part of the power steering servo mechanism which, due to its function, is associated with the rack and pinion housing in a manner to be movable therewith. Thus, upon the steering wheel being rotated in a direction (for example in the counter clockwise direction) both of the servos are pressurized in a manner to move the pistons 68, 70 thereof to the right as seen in the drawings. The movement of the piston 70 assists the relative movement between the rack 20 and the housing 14 while the movement of the piston 68 moves the housing 14 and power steering servo 66 as a unit laterally with respect to the vehicle to add to the steering induced by the first mentioned relative movement. Of course it will be appreciated that the arrangement shown in FIG. 5 is purely schematic and that a number of design variations are encompassed thereby.

What is claimed is:

1. In an automotive vehicle, a steering system comprising;
    a housing supported on a chassis of said vehicle by an elastomeric member;
    a rack slidably disposed in said housing;
    a pinion disposed in said housing, said pinion being arranged to mesh with said rack;
    a steering wheel operatively connected with said pinion for synchronous rotation therewith;
    a source of hydraulic fluid under pressure;
    a hydraulic servo fluidly connected with said source and operatively connected with said housing for selectively biasing same in first and second axial directions;
    a control valve fluidly interposed between said servo and said source for selectively pressurizing said servo in a manner to bias said housing in said first and second axial directions; and
    control means operatively connected with said control valve for controlling said control valve in response to a sensed vehicle operating parameter.

2. A steering correction system as claimed in claim 1, wherein said control means takes the form of a steering wheel angular displacement sensor which senses the angular displacement of said steering wheel in first and second rotational directions from a neutral steering position.

3. A steering correction system as claimed in claim 1, wherein said control means takes the form of a rate of steering wheel angular displacement sensor which senses the rate of angular displacement of said steering wheel in first and second rotational directions from a neutral steering position.

4. A steering correction system as claimed in claim 1, wherein said control means takes the form of a vehicle yaw rate sensor which senses the rate at which a vehicle yaws in first and second rotational directions about an axis essentially normal to said chassis.

5. A steering correction system as claimed in claim 1, wherein said control means takes the form of a solenoid valve including
    a spool and first and second solenoids, said first and second solenoids being energized in a manner to displace said spool and vary the output of said solenoid valve in response to said sensed vehicle operating parameter.

6. A steering correction system as claimed in claim 1, wherein said source comprises part of a power steering system and wherein said control valve and said control means take the form of a power steering control valve which is responsive to the angular displacement of said steering wheel, said power steering system further including a power steering servo which is fluidly connected in parallel with said hydraulic servo and which is associated with said housing so as to be movable therewith.

* * * * *